Patented Apr. 23, 1935

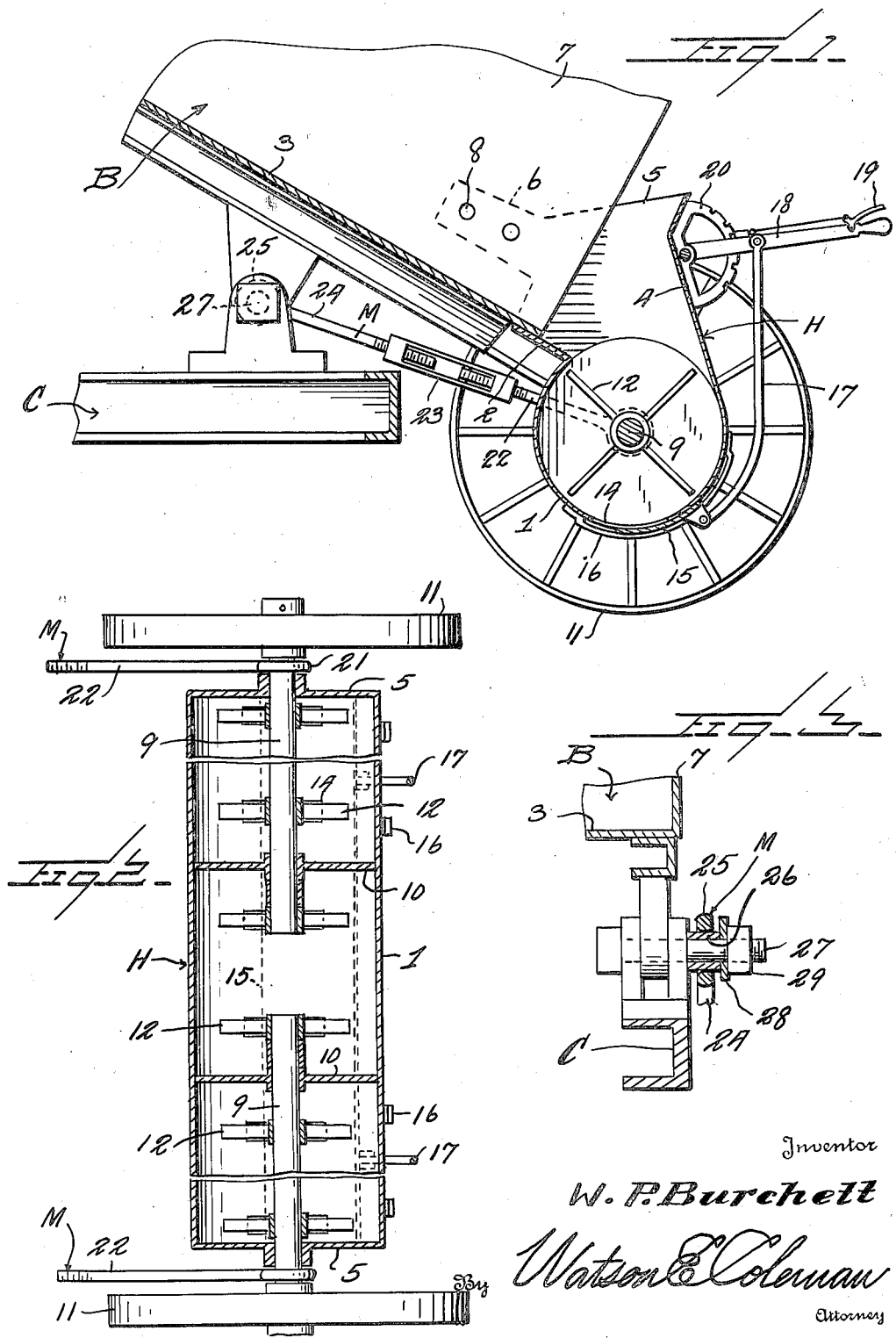

1,999,083

UNITED STATES PATENT OFFICE 1,999,083

SPREADING APPARATUS

Wilford P. Burchett, Olive Hill, Ky.

Application March 17, 1934, Serial No. 716,169

4 Claims. (Cl. 275—2)

This invention relates to a spreading apparatus, and it is primarily an object of the invention to provide an apparatus of this kind intended for the spreading of lime or other soil treating material.

It is also an object of the invention to provide an apparatus of this kind which is adapted to be detachably mounted upon a vehicle and more particularly a vehicle with a dumping body, said attachment including in its construction ground engaging means for operating the apparatus when the body of the vehicle is in dumping position.

An additional object of the invention is to provide an apparatus of this kind including in its construction a hopper body having discharge openings in its wall under control of a valve mechanism whereby the amount of discharge of lime or other material may be regulated or controlled and more particularly with respect to the amount of discharge of lime or other material per acre of the field over which the attachment traverses.

The invention consists in the details of construction and in the combination and arrangement of the several parts of my improved spreading apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view partly in side elevation and partly in section illustrating a spreading apparatus constructed in accordance with an embodiment of my invention and in applied position, the body of the associated vehicle being shown in dumping position;

Figure 2 is a view partly in top plan and partly in section of my improved apparatus as herein disclosed and unapplied;

Figure 3 is an enlarged fragmentary detailed view partly in section and partly in elevation illustrating certain details of construction as herein employed.

As disclosed in the accompanying drawing, C denotes the chassis or frame of a vehicle of any desired type and upon which frame is mounted for tilting movement a body B. This body B is adapted to contain the lime or other material to be distributed and initially the vehicle with which my improved attachment is to be employed is used to transport the material from the source of supply to the field to be treated.

My improved distributor attachment as herein disclosed comprises an elongated hopper-like body H of desired length and dimensions and which has its lower portion 1 substantially circular in cross section while the inner side wall above the portion 1 is forwardly disposed, as at 2, to underlie the bottom 3 of the body B of the vehicle and to closely approach said bottom 3. The opposite or outer wall 4 of the hopper body H is extended upwardly a considerable distance above the bottom 3 of the body B when the distributor attachment is in applied or working position. This portion 4 serves to assure the desired delivery of the material within the body B to the lower portion 1 of the body H when the body B is in dumping position as illustrated in Figure 1 of the accompanying drawing.

The wall portions 2 and 4 are connected by the end walls 5 closing the spaces between said wall portions 2 and 4 and each end wall 5 at a desired distance above the inner wall portion 2 is provided with an extended member or arm 6 which overlies the outer face of a side wall 7 of the body B and said arm 6 is bolted, as at 8, or otherwise detachably connected to said side wall 7 of the body B. It is to be stated that the hopper body H is of a length to assure each of the end walls 5 together with its arm 6 having the desired overlying engagement with a side wall 7 of the body B and in substantially close contact.

The walls 5 close the ends of the lower portion 1 of the body H and disposed through each of said end walls 5 and supported thereby and extending within the portion 1 of the hopper body H at substantially the axial center of said portion 1, is a relatively long shaft 9. The inner portion of the shaft is also directed through and further supported by a bearing 10 carried by and arranged within the portion 1 of the body H. The shaft 9 extends a sufficient distance outwardly of the adjacent end of the hopper H to permit the mounting thereon of a ground engaging member or wheel 11, said mounting being such to assure rotation of the shaft 9 with the member or wheel 11.

Each of the shafts 9 within the portion 1 of the hopper body H has substantially radiating therefrom arms or blades 12 whereby the lime or other material received within the portion 1 of the hopper body B is thoroughly agitated to facilitate the discharge of the lime or other material through the elongated openings 14 provided in the bottom part of the wall of the portion 1. These openings 14 are disposed transversely of the body but in the same general direction as the travel of the attachment when applied to the vehicle.

Overlying the outer face of the under part of the portion 1 of the hopper body H is an elongated valve plate 15 herein disclosed as common to all of the openings or slots 14, and by proper adjustment of this plate 15, or valve member as it may be termed, the flow or discharge of the lime or other material out through the openings or slots 14 may be regulated or controlled as desired and particularly as required per acre of the field over which the attachment traverses when in operation.

Each end portion of the plate or valve member 15 is engaged with a guideway 16 and the opposite end portions of the plate or valve member 15 have operatively engaged therewith elongated rigid arms 17. Each of these arms 17, as herein disclosed, is upwardly disposed and operatively connected with a hand lever 18 carried by and extending rearwardly from the upper part of the forward or outer wall portion 4 of the hopper body H. This lever 18 carries a conventional latch mechanism 19 for coaction with the rack 20 also carried by the upper part of the wall portion 4.

By proper manipulation of the arms 17 the plate or valve member 15 may be readily adjusted with respect to the openings 14. The outer end portion of each of the shafts 9 has engaged therearound an eye 21 arranged at the outer end portion of a rod 22 comprised in a connecting member M. The opposite end portion of this rod 22 is in threaded engagement with a turnbuckle 23 which is also in threaded engagement with a second rod 24 in alignment with the rod 22. The outer end portion of the rod 24 carries an eye 25 which is engaged around a sleeve or collar 26 mounted upon an extended portion of a pivot bolt 27 connecting the body B to the chassis or frame C. Outwardly of this collar or sleeve 26 is a conventional holding washer 28 and nut 29. By proper operation of the turnbuckle 23 each of the members M may be adjusted to assure an effective connection between an axle 9 and the chassis or frame C of the vehicle so that when the attachment is in use direct pull will be imposed to the shafts 9 and thus relieving the strain upon the upper portion of the hopper body H.

It is also to be noted that the connection of each of the members M with a pivot bolt 27 may be readily effected or released which is also equally true of each of the connections 8 hereinbefore referred to. By this provision my improved spreading attachment can be quickly applied or removed as required so that when the working operation is at any considerable distance from the source of supply of the material to be spread a number of vehicles can be employed to carry the material to the operation but only a single spreader will be required. Upon arrival of a loaded vehicle the spreader attachment can be easily applied and after the load has been distributed over the field the attachment can be quickly removed for placement upon another vehicle. It is also to be noted that the mounting of my attachment is such that when it is applied to the vehicle and the dumping body is in its lowered or substantially horizontal position the attachment is raised and the members or wheels 11 are free from contact with the road or ground surface. This is particularly desirable under those conditions when the attachment applied to the vehicle is being transported from place to place or during those times when the vehicle is in transit but it is not desired to spread.

From the foregoing description it is thought to be obvious that a spreading apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. The combination with a vehicle chassis and a pivoted dump body carried by said chassis; of a spreader attachment comprising a hopper having discharge openings, ground engaging wheels carried by the hopper, agitators within the hopper rotating with the ground engaging wheels, means carried by the hopper for connecting the same to the dump body at the discharge end thereof, members interposed between the end portions of the hopper and the chassis of the vehicle, and means connecting said members with the hopper and chassis to allow the hopper to swing with the dump body.

2. The combination with the chassis of a vehicle, a dump body, and members for pivotally connecting the dump body and the chassis; of a spreader attachment comprising a hopper to be positioned at the discharge end of the dump body, to receive the contents of the dump body when said dump body is in dumping position, axles carried by the hopper and extending beyond the opposite ends thereof, ground engaging wheels mounted on said extended portions of the axles, members freely engaged with the axles and with the members for pivotally connecting the dump body to the chassis, and means for connecting each end portion of the hopper to the dump body.

3. The combination with the chassis of a vehicle, a dump body, and members for pivotally connecting the dump body and the chassis; of a spreader attachment comprising a hopper to be positioned at the discharge end of the dump body to receive the contents of the dump body when said dump body is in dumping position, axles carried by the hopper and extending beyond the opposite ends thereof, ground engaging wheels mounted on said extended portions of the axles, members freely engaged with the axles and with the members for pivotally connecting the dump body to the chassis, means connecting each end portion of the hopper and the dump body, each of the connecting members comprising spaced rods, and a turnbuckle connecting adjacent extremities of said rods.

4. A spreader attachment for a dumping vehicle comprising a hopper including side and end walls, one of the side walls having an upper portion to underlie the discharge end of the dump body of the vehicle, the upper portion of the second side wall extending above the bottom of the dump body to assure discharge of the load of the body into the hopper when said body is in dumping position, arms carried by the end walls to overlie the side walls of the dump body for connection therewith, the bottom of the hopper being provided with discharge openings, agitating means within the hopper, ground engaging wheels arranged adjacent to the end portions of the hopper for operating the agitating means when said wheels are in contact with the ground, and members engaged with the hopper adjacent the wheels, said members being adapted for connection with the vehicle.

WILFORD P. BURCHETT.